J. TISCHLER.
RIVETING DEVICE.
APPLICATION FILED JULY 3, 1909.
948,980.
Patented Feb. 8, 1910.
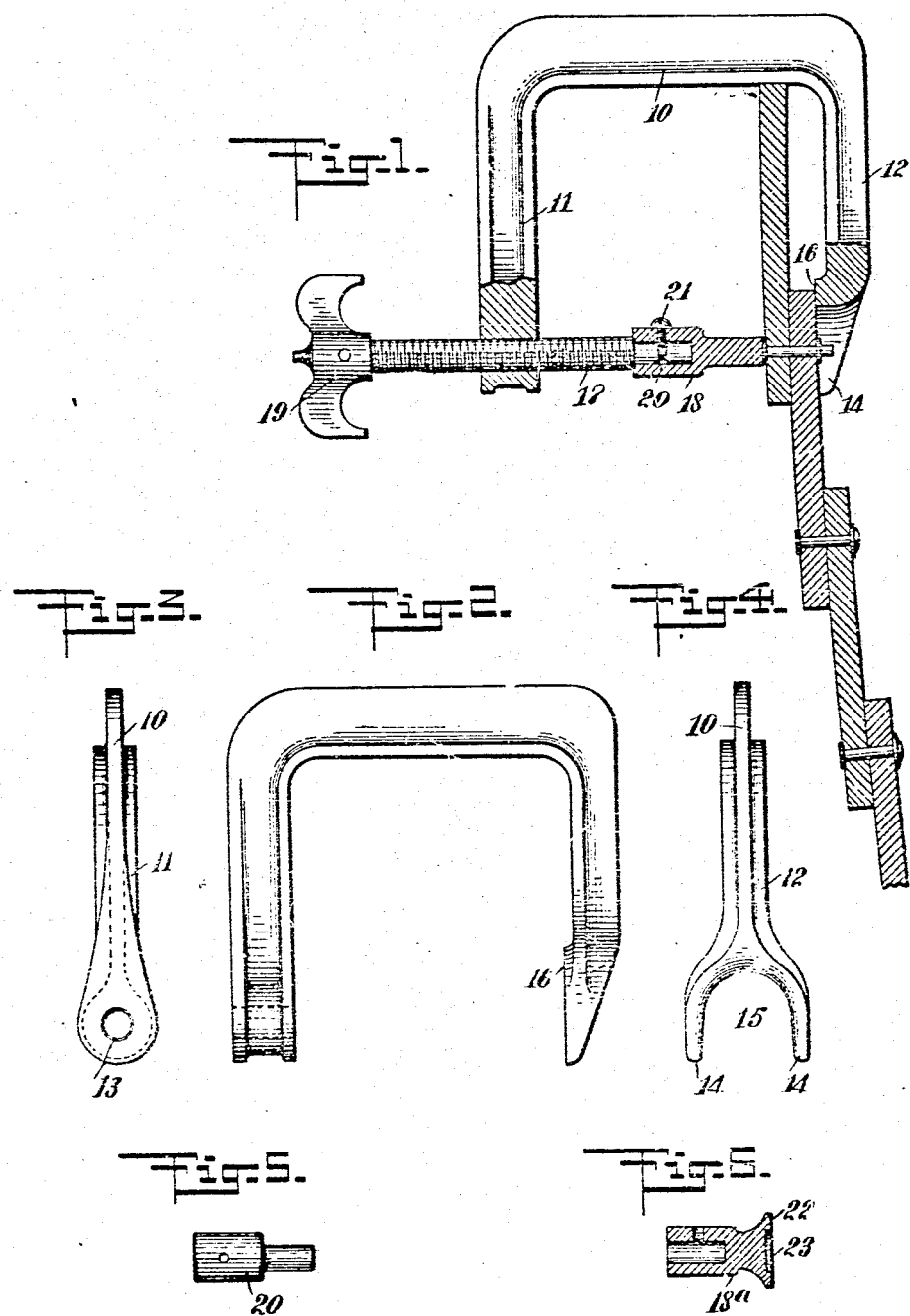
WITNESSES
INVENTOR
John Tischler
BY
ATTORNEYS

UNITED STATES PATENT OFFICE.

JOHN TISCHLER, OF EAST PORTCHESTER, CONNECTICUT.

RIVETING DEVICE.

948,980.  Specification of Letters Patent.  Patented Feb. 8, 1910.

Application filed July 3, 1909. Serial No. 505,918.

*To all whom it may concern:*

Be it known that I, JOHN TISCHLER, a citizen of the United States, and a resident of East Portchester, in the county of Fairfield and State of Connecticut, have invented a new and Improved Riveting Device, of which the following is a full, clear, and exact description.

This invention relates to certain improvements in riveting devices, and involves a new and improved clamp so constructed that it may engage with the head of a rivet to hold the latter in place, and, at the same time, to leave the opposite end of the rivet exposed so that it may be pounded or beatened into the form of a second head.

My improved riveting clamp includes a frame with arms rigid in respect to each other and adapted to extend upon opposite sides of the material through which the rivet is being secured. The length of these arms will depend entirely upon the distance of the rivet from the edge of the material. One of these arms is provided with a screw rod movable longitudinally into engagement with the head of the rivet and adapted to force the rivet to its seat and hold it there while the riveting action is taking place. The other arm is provided with a clamping face for engaging with the opposite side of the material, and is so formed that this clamping face presents portions upon opposite sides of the rivet but leaves the end of the rivet free and exposed to permit it to be swaged or pounded over.

Various changes may be made in the specific form and relative proportions of the clamp, but these changes will be dependent largely upon the character of the work in connection with which it is to be employed.

Reference is to be had to the accompanying drawings, forming a part of this specification, in which similar characters of reference indicate corresponding parts in all the figures, and in which—

Figure 1 shows one form of my improved riveting clamp, especially designed for use in securing the rivets in a lapped seam bolt; Fig. 2 is a side elevation of the body portion of the clamp; Fig. 3 is a view of one end of the body portion; Fig. 4 is a view of the opposite end of the body portion; Fig. 5 is a side elevation of one form of clamping head; and Fig. 6 is a longitudinal section through a modified form of clamping head.

In the specific form illustrated, I employ a body portion or frame 10, having arms 11 and 12 substantially parallel and rigid in respect to each other. These arms are spaced apart and are of approximately the same length. One of the arms is provided with a threaded aperture therethrough, the axis of which is substantially parallel to the body portion of the frame. The opposite arm 12 terminates in two fingers 14, constituting a fork or yoke and spaced apart to leave an opening or passage 15 therebetween. This passage is in direct alinement with the axis of the threaded aperture 13, and the two fingers constitute portions lying upon opposite sides of said axis. The two fingers or portions 14, 14, have a face 16 lying in a plane substantially at right angles to the axis of the threaded aperture and constituting a clamping face for engagement with one side of the material. Threaded through the aperture 13 is a screw rod 17, having a clamping head 18 and any suitable handle 19 to facilitate the rotation of the rod. The head 18 is so connected to the screw rod that it need not necessarily rotate during the rotation of the screw rod. Preferably, the screw rod has an annular groove 20 in its outer surface adjacent the free end, and the clamping head 18 has an inwardly-extending set screw 21 entering this groove. The outer end or face of the clamping head 18 may be of any shape desired dependent upon the character of the work to be performed. The head 18 shown in Figs. 1 and 5 has a reduced end of substantially the same size as the head of the rivet to be held, while the head 18ª shown in Fig. 6, has an enlarged face 22 with a central recess 23 to receive a particular shaped rivet or bolt head.

The specific form of the device illustrated is particularly adapted for use during the riveting together of the lapped bars forming the side of a boat or other vessel. After each bar is placed in position, the clamp is placed over the edge of the bar with the clamping head 18 in engagement with the head of the rivet. A screw rod is turned until the clamping face 16 firmly engages with the inner surface of one bar and the clamping head 18 firmly engages with the head of the rivet. The opposite end of the rivet will be disposed centrally of the passage 15 and will be freely exposed, so that after the washer is placed in position, the end of the rivet may receive blows from various different angles in swaging the head to hold the washer in place.

Having thus described my invention, I claim as new and desire to secure by Letters Patent:

A riveting clamp, comprising a frame, including two arms, one of said arms having a threaded aperture therethrough and the other of said arms having branches disposed upon opposite sides of the longitudinal axis of said threaded aperture and presenting clamping faces in a plane at right angles to said axis, and a screw rod longitudinally movable through the threaded aperture and having an annular groove adjacent one end thereof, and a clamping head having a socket for receiving the last-mentioned end of said screw rod and having means extending into said groove for preventing relative longitudinal movement of the screw rod and head, but preventing their relative rotation, said clamping head presenting a face for engagement with the head of a rivet or the like, the opposite end of the rivet being disposed between the spaced branches of the second-mentioned arm.

In testimony whereof I have signed my name to this specification in the presence of two subscribing witnesses.

JOHN TISCHLER.

Witnesses:
   IMOGENE WESSELS,
   ETHEL SLATER.